US012578731B2

(12) United States Patent
Takehara et al.

(10) Patent No.: US 12,578,731 B2
(45) Date of Patent: Mar. 17, 2026

(54) POSITION ESTIMATION DEVICE, AUTOMATED DRIVING SYSTEM, POSITION ESTIMATION METHOD, AND STORAGE MEDIUM STORING PROGRAM

(71) Applicant: Mitsubishi Electric Corporation, Tokyo (JP)

(72) Inventors: Nariaki Takehara, Tokyo (JP); Kohei Mori, Tokyo (JP); Hiroshi Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 101 days.

(21) Appl. No.: 18/442,797

(22) Filed: Feb. 15, 2024

(65) Prior Publication Data

US 2024/0319736 A1      Sep. 26, 2024

(30) Foreign Application Priority Data

Mar. 22, 2023    (JP) ................................. 2023-044844

(51) Int. Cl.
| | |
|---|---|
| *G05D 1/24* | (2024.01) |
| *B60W 40/114* | (2012.01) |
| *G05D 1/43* | (2024.01) |

(52) U.S. Cl.
CPC ............. *G05D 1/24* (2024.01); *B60W 40/114* (2013.01); *G05D 1/43* (2024.01); *B60W 2520/14* (2013.01)

(58) Field of Classification Search
CPC ......... G05D 1/24; G05D 1/43; B60W 40/114; B60W 2520/14
See application file for complete search history.

(56) References Cited

U.S. PATENT DOCUMENTS

| | | | |
|---|---|---|---|
| 11,441,905 B2 | 9/2022 | Mori et al. | |
| 2018/0144637 A1* | 5/2018 | Ikedo ..................... | G08G 1/166 |
| 2019/0106113 A1* | 4/2019 | Kato .................... | B60W 40/114 |
| 2019/0227177 A1* | 7/2019 | Zalewski .............. | G01S 19/396 |
| 2021/0116914 A1* | 4/2021 | Ren ......................... | G05D 1/024 |
| 2022/0250629 A1* | 8/2022 | Okada .................. | G06V 20/588 |
| 2022/0340203 A1* | 10/2022 | Iizuka ................... | B62K 21/00 |

FOREIGN PATENT DOCUMENTS

| | | | | |
|---|---|---|---|---|
| JP | 6113333 B1 | 4/2017 | | |
| JP | 7036080 B2 | 3/2022 | | |
| JP | 7170149 B2 | * | 11/2022 | ............. B62D 5/046 |

* cited by examiner

*Primary Examiner* — Amelia Vorce

(74) *Attorney, Agent, or Firm* — Sughrue Mion, PLLC

(57) ABSTRACT

There is provided a position estimation device that includes a weight determination unit to determine weights for first yaw information of a vehicle based on an angular velocity of the vehicle, for second yaw information of the vehicle based on movement distances of left and right wheels of the vehicle, and for third yaw information of the vehicle based on a steering angle and a vehicle speed of the vehicle. The position estimation unit further includes a yaw information acquiring unit, to acquire the first to third yaw information, a combining unit to generate combined yaw information, and a position estimation unit to estimate a position of the vehicle using positioning information of the vehicle, the vehicle speed of the vehicle, and the combined yaw information.

11 Claims, 5 Drawing Sheets

Weight Information

POSITION ESTIMATION DEVICE, AUTOMATED DRIVING SYSTEM, POSITION ESTIMATION METHOD, AND STORAGE MEDIUM STORING PROGRAM

TECHNICAL FIELD

The present disclosure relates to a position estimation device, an automated driving system, a position estimation method, and a storage medium storing a program.

BACKGROUND ART

Absolute positioning requires interpolation of data that has not been obtained at positioning intervals, compensation of data in a section where positioning is not performed due to shielding by a tunnel, a building, or the like, or monitoring of positioning accuracy. For this reason, the position of a vehicle is estimated by a combination of absolute positioning and relative positioning. The absolute positioning is, for example, global positioning system (GPS) satellite positioning. The relative positioning, which is autonomous navigation of a vehicle, uses sensor information from a sensor that detects a behavior of the vehicle during traveling to estimate the position of the vehicle.

Examples of the sensor that detects the behavior of the vehicle during traveling include a vehicle speed sensor, a gyro sensor, a wheel speed sensor, and a steering angle sensor. For example, the relative positioning includes a first positioning method using the angular velocity of the vehicle detected by the gyro sensor, a second positioning method using a difference in movement distance between left and right wheels detected by the wheel speed sensor, and a third positioning method using the steering angle of the vehicle detected by the steering angle sensor.

For example, Patent Literature 1 describes an inertial navigation device that estimates the position of a vehicle on the basis of accumulation of movement amounts of the vehicle detected by an internal sensor when there is no information from an external sensor.

In Patent Literature 1, the external sensor detects a condition other than the vehicle. The internal sensor includes sensors that detect a state of the vehicle, such as an inertial measurement unit (IMU) capable of detecting three-axis angular velocities (pitch rate, roll rate, and yaw rate) and three-axis accelerations (longitudinal acceleration, lateral acceleration, and vertical acceleration) indicating a behavior of the vehicle during traveling, a vehicle speed sensor, and a steering angle sensor.

CITATION LIST

Patent Literatures

Patent Literature 1: Japanese Patent No. 7036080

SUMMARY OF INVENTION

Technical Problem

The first positioning method, the second positioning method, and the third positioning method, which are relative positioning, have a problem that an error occurs depending on characteristics of each method.

The conventional technique described in Patent Literature 1 enables estimation of the position of the vehicle by a positioning method, out of the first positioning method and the third positioning method, for selecting sensor values of an acceleration, an angular velocity, and a steering angle of the vehicle under certain conditions and using the selected sensor values. Therefore, in a case where the positioning method with a small error is not appropriately selected, the position of the vehicle cannot be accurately estimated.

The present disclosure solves the above problems, and an object of the present disclosure is to obtain a position estimation device, an automated driving system, a position estimation method, and a storage medium storing a program capable of suppressing an error depending on characteristics of a positioning method.

Solution to Problem

A position estimation device according to the present disclosure includes: processing circuitry performing: to determine, on a basis of a travel state of a vehicle or a peripheral state of the vehicle, weights to be set to first yaw information of the vehicle based on an angular velocity of the vehicle, second yaw information of the vehicle based on a difference in movement distance between left and right wheels of the vehicle, and third yaw information of the vehicle based on a steering angle and a vehicle speed of the vehicle; to acquire the first yaw information, the second yaw information, and the third yaw information; to generate combined yaw information obtained by combining the first yaw information, the second yaw information, and the third yaw information to which the determined weights have been set; and to estimate a position of the vehicle using positioning information of the vehicle, the vehicle speed of the vehicle, and the combined yaw information.

Advantageous Effects of Invention

According to the present disclosure, weights to be set to the first yaw information based on the angular velocity of the vehicle, the second yaw information based on the difference in movement distance between the left and right wheels of the vehicle, and the third yaw information of the vehicle based on the steering angle and the vehicle speed of the vehicle are determined on the basis of the travel state of the vehicle or the peripheral state of the vehicle, and the position of the vehicle is estimated using combined yaw information obtained by combining the first yaw information, the second yaw information, and the third yaw information to which the determined weights have been set, positioning information of the vehicle, the speed of the vehicle, and the combined yaw information. With this configuration, the position estimation device according to the present disclosure can suppress an error depending on characteristics of a positioning method.

DESCRIPTION OF EMBODIMENTS

First Embodiment

Overview of Automated Driving System

Figure 1:
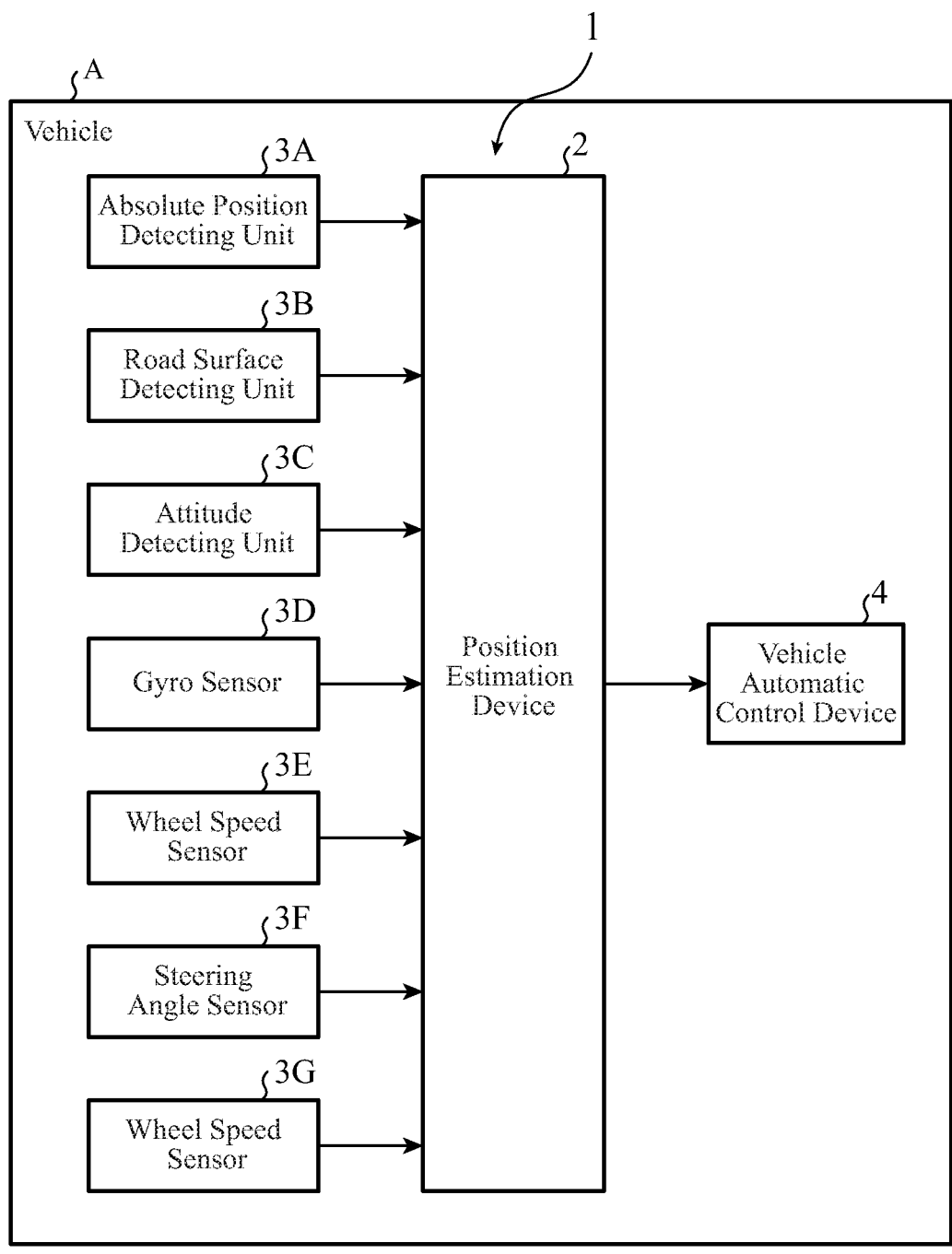
FIG. 1 is a block diagram illustrating the configuration of an automated driving system according to a first embodiment.

FIG. 1 is a block diagram illustrating the configuration of an automated driving system 1 according to a first embodiment. In FIG. 1, the automated driving system 1 automatically controls traveling of a vehicle A, and includes a position estimation device 2, an absolute position detecting unit 3A, a road surface detecting unit 3B, an attitude detecting unit 3C, a gyro sensor 3D, a wheel speed sensor 3E, a steering angle sensor 3F, a vehicle speed sensor 3G, and a vehicle automatic control device 4. Note that the position estimation device 2 is not limited to a device mounted on the vehicle A whose position is to be estimated, and may be an external device capable of exchanging data between the sensors 3A to 3G mounted on the vehicle A and the vehicle automatic control device 4.

Overview of Position Estimation Device

The position estimation device 2 determines, on the basis of a travel state of the vehicle A or the peripheral state of the vehicle A, weights to be set to first yaw information based on the angular velocity of the vehicle A, second yaw information based on a difference in movement distance between left and right wheels of the vehicle A, and third yaw information of the vehicle A based on the steering angle and the vehicle speed of the vehicle A, generates combined yaw information obtained by combining the first yaw information, the second yaw information, and the third yaw information to which the determined weights have been set, and estimates the position of the vehicle A using positioning information of the vehicle A, the speed of the vehicle A, and the combined yaw information.

In the following description, a single computer has all of the functions of the position estimation device 2 unless otherwise specified. However, all of the functions of the position estimation device 2 may be implemented by one computer or a plurality of computers. The detail of the position estimation device 2 will be described later.

The first yaw information is first yaw angle information calculated on the basis of the angular velocity of the vehicle A by a first positioning method. The second yaw information is second yaw angle information calculated on the basis of the difference in movement distance between the left and right wheels of the vehicle A by a second positioning method. The third yaw information is third yaw angle information calculated on the basis of the steering angle and the speed of the vehicle A by a third positioning method.

The first positioning method is a positioning method using the angular velocity of the vehicle A detected by the gyro sensor 3D. With the first positioning method, an amount of movement of the vehicle A in the lateral direction is calculated using the angular velocity of the vehicle A detected by the gyro sensor 3D. The amount of movement of the vehicle A in the lateral direction is the first yaw angle information indicating an angular velocity (hereinafter referred to as a yaw angle) around the yaw axis of the vehicle A. Further, an amount of movement of the vehicle A in the longitudinal direction is calculated using the vehicle speed or a wheel speed pulse of the vehicle A detected by the vehicle speed sensor 3G. The relative position of the vehicle A is calculated using these calculation results.

The gyro sensor 3D detects an angular velocity including sideslip of the vehicle A. The offset or drift error of the gyro sensor 3D is an integration error accumulated during traveling of the vehicle A. For example, an error in which the zero point is offset with the lapse of time occurs in the gyro sensor 3D. Therefore, in the first positioning method, it is necessary to perform so-called learning of removing an error accumulated over time in the sensor value detected by the gyro sensor 3D. For example, the learning includes removing an error on the assumption that the vehicle A which is stationary has a zero point of the gyro sensor 3D. The learning also includes removing an error from a sensor value detected by the gyro sensor 3D using a satellite positioning result.

The satellite positioning is performed, for example, at regular time intervals of about 1 second. For this reason, when the vehicle A is traveling at high speed, the position estimation device 2 of the vehicle A acquires the satellite positioning result less frequently, so that the frequency of learning is also reduced, and the positioning accuracy by the first positioning method is reduced.

In addition, even when the vehicle A is traveling at low speed, the accuracy of estimating the azimuth of the vehicle A using the satellite positioning result is reduced, and thus, the positioning accuracy by the first positioning method is reduced.

Furthermore, while the vehicle A is traveling in a place such as a tunnel where the position estimation device 2 cannot acquire a satellite positioning result, learning cannot be performed, and an error occurs in positioning by the first positioning method.

The second positioning method is a positioning method using the movement distances of the left and right wheels of the vehicle A detected by the wheel speed sensor 3E. In the second positioning method, the second yaw angle information is calculated by integrating the geometrically calculated yaw rate of the vehicle A using the difference in movement distance between the left and right wheels of the vehicle A detected by the wheel speed sensor 3E and the tread length.

Further, an amount of movement of the vehicle A in the longitudinal direction is calculated using an average value of the moving speeds of the left and right wheels of the vehicle A. With the second positioning method, the relative position of the vehicle A is calculated using these calculation results.

With the second positioning method, the second yaw angle information is calculated using the difference in movement amount (difference in rotation) between the left and right wheels of the vehicle A detected by the wheel speed sensor 3E. The error of the second yaw angle information is less likely to increase even when the vehicle A travels a long distance. On the other hand, when the vehicle A is turning, the estimation accuracy of the second yaw angle information decreases. This is related to a change in the tread due to a change in the point of application of force of the tire of the vehicle A. Specifically, due to the turning motion of the vehicle A, the place where the force is applied in the width direction of the tire changes, and the center of the tire width is not the place where the largest force is applied. Therefore, the distance (scale factor) traveled by the vehicle A in one rotation of the tire is changed by the turning motion of the vehicle A. The change in the scale factor causes an error in positioning by the second positioning method.

The third positioning method is a positioning method using the steering angle of the vehicle A detected by the steering angle sensor 3F. In the third positioning method, the third yaw angle information is calculated by integrating the yaw rate of the vehicle A calculated in accordance with the equation of motion using the steering angle of a steering wheel of the vehicle A detected by the steering angle sensor 3F and the vehicle speed of the vehicle A detected by the vehicle speed sensor 3G.

Further, an amount of movement of the vehicle A in the longitudinal direction is calculated using the vehicle speed of the vehicle A detected by the vehicle speed sensor 3G. With the third positioning method, the relative position of the vehicle A is calculated using these calculation results.

In addition, in the third positioning method, the calculation of the yaw rate (change amount of the yaw angle in a certain period of time) using the steering angle of the vehicle A detected by the steering angle sensor 3F is based on the premise that the vehicle A performs steady-state circular turning. When the vehicle speed of the vehicle A increases, a sideslip angle of the vehicle A occurs due to the generation of lateral force of the vehicle A, and thus, an error in positioning by the third positioning method increases.

On the other hand, the positioning result by the third positioning method is basically stable without drift due to temperature or the like, and thus, the integration error is smaller than that of the IMU.

The first positioning method, the second positioning method, and the third positioning method include, for example, usage modes (1) to (3). The position estimation device 2 determines weights based on the usage modes (1) to (3), and estimates the position and azimuth of the vehicle A using combined yaw information obtained by combining the yaw information of the first positioning method, the yaw information of the second positioning method, and the yaw information of the third positioning method with the determined weights. As a result, an error depending on the characteristics of each positioning method can be suppressed.

(1) In a case where the motion of the vehicle A is approximately linear, the yaw information obtained by the first positioning method is used to estimate the position if the learning condition is good, whereas the yaw information obtained by the second positioning method is used to estimate the position if the learning condition is bad.
  (2) In a case where the motion of the vehicle A is approximately a turning motion and the speed of the vehicle A is low, the use of the yaw information obtained by the third positioning method provides higher accuracy in estimating the position.
  (3) In a case where the motion of the vehicle A is approximately a turning motion and the speed of the vehicle A is high, the use of the yaw information obtained by the first positioning method provides higher accuracy in estimating the position.

The absolute position detecting unit 3A is a sensor that detects the absolute position of the vehicle A. For example, the absolute position detecting unit 3A receives a GPS signal from a GPS satellite at a positioning interval of about 1 second, and detects an absolute position on the earth such as latitude and longitude of the vehicle A and an azimuth of the vehicle A which are included in the GPS signal, and reliability of the measured absolute position. These pieces of detection information are output as positioning information of the vehicle A from the absolute position detecting unit 3A to the position estimation device 2 and stored in an absolute position storage unit 5.

The absolute position detecting unit 3A is not limited to employ satellite positioning, and may be any unit capable of detecting the absolute position of the vehicle A.

For example, the absolute position detecting unit 3A may calculate the absolute position of the vehicle A using information detected by a camera or light detection and ranging (LiDAR) mounted on the vehicle A and map information.

Furthermore, the absolute position detecting unit 3A may use, for example, a positioning means using ultra wide band (UWB) wireless communication.

The road surface detecting unit 3B is a sensor that detects a road surface state of a road on which the vehicle A is traveling, and detects an unevenness state, a frozen state, and a wet state of the road surface.

For example, the road surface detecting unit 3B includes a camera that captures a road surface image, and an image analysis unit that detects a state of the road surface using a result obtained by analyzing the image captured by the camera. Further, the road surface detecting unit 3B may detect amounts of change of a pitch rate and a roll rate of the vehicle A detected by the gyro sensor 3D as road surface state information.

In a case where at least one of the pitch rate or the roll rate of the vehicle A greatly changes, it can be determined that the undulation of the road surface is large enough to generate vibration of the vehicle A.

The attitude detecting unit 3C is a sensor that detects the attitude of the vehicle A. The attitude of the vehicle A is, for example, a roll angle and a pitch angle of the vehicle A. Specifically, the attitude detecting unit 3C detects a roll angle around a roll axis extending in the longitudinal direction of the vehicle A and a pitch angle around a pitch axis extending in the lateral direction of the vehicle A. The attitude detecting unit 3C outputs attitude information including the roll angle and the pitch angle of the vehicle A to the position estimation device 2.

The gyro sensor 3D is a sensor that detects a yaw angular velocity (that is, yaw rate) around the yaw axis of the vehicle A.

For example, the gyro sensor 3D is a vibration gyro sensor that detects the angular velocity of the vehicle A on the basis of the Coriolis force applied to the vibrated element.

Alternatively, the gyro sensor 3D may be an optical fiber gyro sensor using the Sagnac effect or an optical gyro sensor such as a ring laser gyro. The gyro sensor 3D detects a yaw angular velocity (yaw rate) around the yaw axis which is a vertical axis of the vehicle A.

The gyro sensor 3D may be a six-axis sensor that detects the acceleration in the longitudinal direction of the vehicle A, the acceleration in the lateral direction of the vehicle A, the acceleration in the vertical direction of the vehicle A, the angular velocity around the roll axis, the angular velocity around the pitch axis, and the angular velocity around the yaw axis. That is, the gyro sensor 3D may be an IMU.

Alternatively, the gyro sensor 3D may be a three-axis sensor combined with a sensor that detects acceleration in the roll axis direction of the vehicle A and acceleration in the pitch axis direction of the vehicle A.

The wheel speed sensor 3E is a sensor that detects the wheel speeds of the left and right wheels of the vehicle A. For example, the wheel speed sensor 3E calculates the wheel speeds of the front-left and rear-left wheels and the wheel speeds of the front-right and rear-right wheels from the rotation of the left and right wheels of the vehicle A. Further, the wheel speed sensor 3E outputs wheel speed information indicating the wheel speeds of the left and right wheels to the position estimation device 2.

The steering angle sensor 3F is a sensor that detects a steering angle that is a rotation angle of the steering wheel of the vehicle A. The steering angle sensor 3F outputs steering angle information indicating the steering angle to the position estimation device 2.

The vehicle speed sensor 3G is a sensor that detects the speed of the vehicle A. For example, the vehicle speed sensor 3G detects the vehicle speed of the vehicle A by measuring a wheel speed pulse that is a pulse signal generated with the rotation of the wheels of the vehicle A. Note that the vehicle speed sensor 3G outputs vehicle speed information indicating the vehicle speed to the position estimation device 2.

The vehicle automatic control device 4 controls the movement of the vehicle A on the basis of the position of the vehicle A estimated by the position estimation device 2 or the position and azimuth of the vehicle A estimated by the position estimation device 2. For example, the vehicle automatic control device 4 determines a position and an azimuth in which the vehicle A should move next based on the position of the vehicle A or the position and the azimuth of the vehicle A estimated by the position estimation device 2, and controls the movement of the vehicle A in such a way that the vehicle A has the determined position and azimuth.

(Details of Position Estimation Device)

Figure 2:
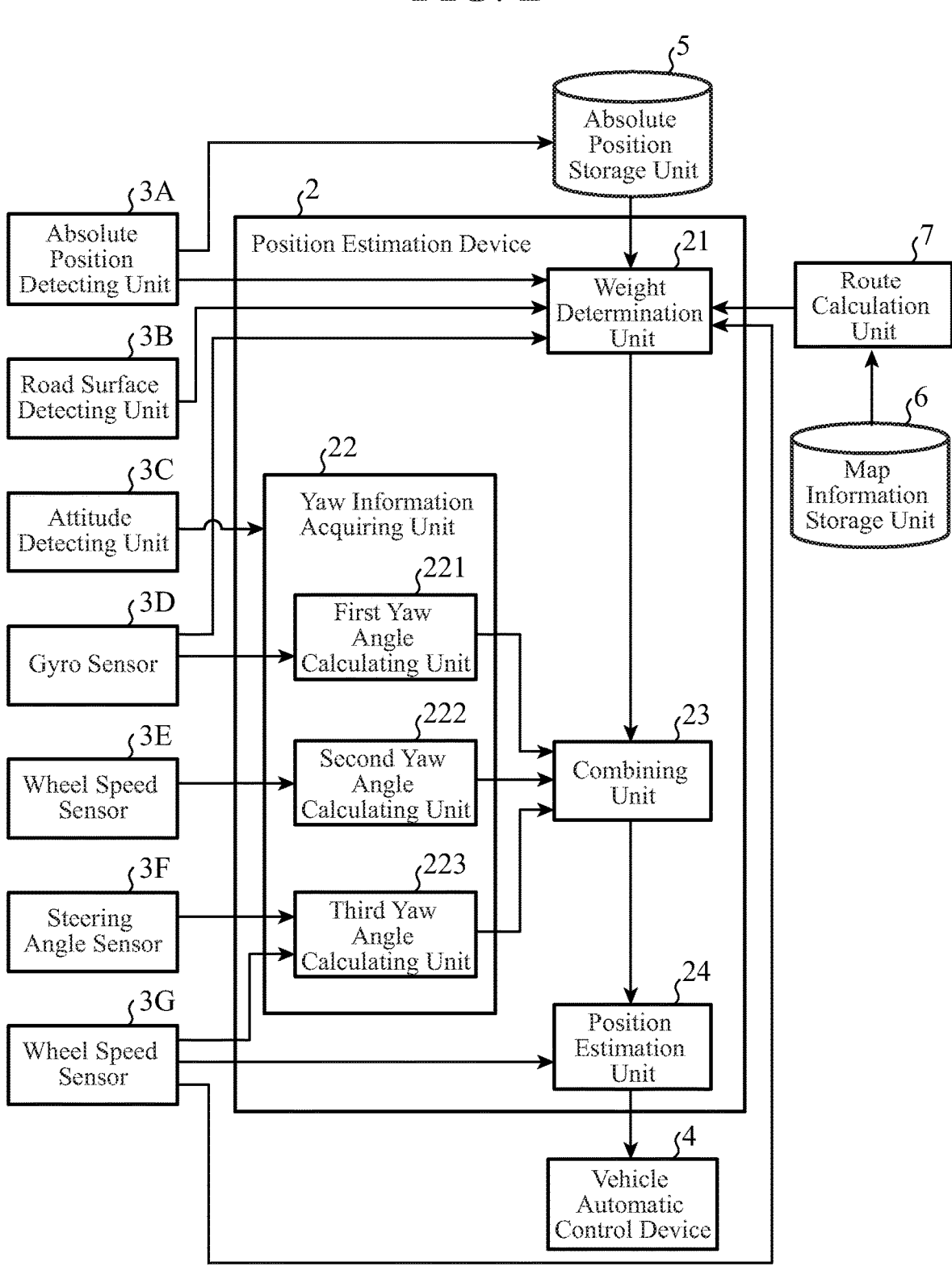
FIG. 2 is a block diagram illustrating the configuration of a position estimation device according to the first embodiment.

FIG. 2 is a block diagram illustrating the configuration of the position estimation device 2. In FIG. 2, the absolute position storage unit 5 and a map information storage unit 6 are storage units provided independently of the position estimation device 2. The route calculation unit 7 is included in a navigation device (not illustrated in FIG. 2). For example, the position estimation device 2 can access the absolute position storage unit 5 and the route calculation unit 7 via a network (not illustrated) in FIG. 2, can acquire positioning information of the vehicle A from the absolute position storage unit 5, and can acquire travel route information of the vehicle A from the route calculation unit 7.

(Absolute Position Storage Unit)

The absolute position storage unit 5 is a storage unit that stores positioning information of the vehicle A detected by the absolute position detecting unit 3A. For example, the absolute position storage unit 5 is provided independently of the position estimation device 2 and accessible from the position estimation device 2.

Note that the position estimation device 2 may include the absolute position storage unit 5.

(Map Information Storage Unit)

The map information storage unit 6 stores map information. For example, the map information storage unit 6 is provided independently of the position estimation device 2 and accessible from the position estimation device 2. Note that the map information storage unit 6 may be included in the position estimation device 2 or may be included in the navigation device.

(Route Calculation Unit)

The route calculation unit 7 calculates a travel route along which the vehicle A travels using the map information read from the map information storage unit 6. For example, the route calculation unit 7 calculates a target travel route for automated travel of the vehicle A. Note that the vehicle automatic control device 4 performs control in such a way that the vehicle A travels along the target travel route based on the position of the vehicle A or the position and azimuth of the vehicle A estimated by the position estimation device 2.

As illustrated in FIG. 2, the position estimation device 2 includes a weight determination unit 21, a yaw information acquiring unit 22, a combining unit 23, and a position estimation unit 24. An arithmetic unit (not illustrated in FIG. 2) included in the position estimation device 2 executes an information processing application, thereby implementing the functions of the weight determination unit 21, the yaw information acquiring unit 22, the combining unit 23, and the position estimation unit 24.

(Weight Determination Unit)

The weight determination unit 21 determines, on the basis of the travel state of the vehicle A or the peripheral state of the vehicle A, weights to be set to the first yaw angle information of the vehicle A based on the angular velocity of the vehicle A, the second yaw angle information of the vehicle A based on the difference in movement distance between the left and right wheels of the vehicle A, and the third yaw angle information of the vehicle A based on the steering angle and the vehicle speed of the vehicle A. The travel state of the vehicle A is, for example, a state indicated by at least one of the angular velocity of the vehicle A or the vehicle speed of the vehicle A. The peripheral state of the vehicle A is, for example, a road surface state of a travel route along which the vehicle A is traveling, the road surface state being determined by positioning information of the vehicle A.

For example, in a case where the vehicle speed of the vehicle A is equal to or greater than a first threshold, the angular velocity of the vehicle A is less than a second threshold, and the time during which the error in the angular velocity of the vehicle A is not removed is less than a given time, the weight determination unit 21 may increase the weight of the first yaw angle information, decrease the weight of the second yaw angle information, and decrease the weight of the third yaw angle information. Here, the first threshold is a value related to a vehicle speed for determining whether the vehicle A travels at low speed or high speed. Further, the second threshold is a value related to an angular velocity for determining whether the turning amount of the vehicle A is small or large.

That is, when the vehicle speed of the vehicle A is equal to or greater than the first threshold and the angular velocity of the vehicle A is less than the second threshold, the vehicle A is traveling at high speed with a small turning amount.

In a case where the turning amount of the vehicle A is small and the speed is high, the motion of the vehicle A is approximately linear. In this case, if the learning condition for the sensor value detected by the gyro sensor 3D is good, the yaw information obtained by the first positioning method is used to estimate the position, and if the learning condition is bad, the yaw information obtained by the second positioning method is used to estimate the position, as described in the usage mode (1).

When the vehicle A turns, the detection accuracy of the second yaw angle information using the wheel speed detected by the wheel speed sensor 3E decreases. On the other hand, since the time during which the error in the angular velocity of the vehicle A is not removed is less than the given time, the error is not accumulated so much in the sensor value detected by the gyro sensor 3D, and thus, the learning condition is good. Therefore, the first positioning method using the sensor value detected by the gyro sensor 3D enables more stable detection of the yaw angle information than the second positioning method and the third positioning method.

In view of this, the weight determination unit 21 increases the weight of the first yaw angle information using the angular velocity detected by the gyro sensor 3D, decreases the weight of the second yaw angle information, and decreases the weight of the third yaw angle information.

For example, in a case where the vehicle speed of the vehicle A is equal to or greater than the first threshold, the angular velocity of the vehicle A is less than the second threshold, and the time during which the error in the angular velocity of the vehicle A is not removed is equal to or longer than the given time, the weight determination unit 21 may decrease the weight of the first yaw angle information and increase the weight of the second yaw angle information. In a case where the angular velocity of the vehicle A is less than the second threshold and the vehicle A is not substantially turning, the detection accuracy of the second yaw angle information using the wheel speed detected by the wheel speed sensor 3E is maintained.

On the other hand, in a case where the time during which the error in the angular velocity of the vehicle A detected by the gyro sensor 3D is not removed is equal to or longer than the given time because the vehicle A travels in a place, such as a tunnel, where the satellite positioning result cannot be acquired, errors are sufficiently accumulated in the sensor value detected by the gyro sensor 3D.

In view of this, the weight determination unit 21 decreases the weight of the first yaw angle information using the angular velocity detected by the gyro sensor 3D, and increases the weight of the second yaw angle information using the difference in movement distance between the left and right wheels of the vehicle A detected by the wheel speed sensor 3E. Thus, the position estimation device 2 can stably calculate the combined yaw information used for estimating the position of the vehicle A.

In a case where the vehicle speed of the vehicle A is less than the first threshold, and the angular velocity of the vehicle A is less than the second threshold, the weight determination unit 21 increases the weight of the second yaw angle information, decreases the weight of the first yaw angle information, and decreases the weight of the third yaw angle information.

When the vehicle speed of the vehicle A is less than the first threshold and the angular velocity of the vehicle A is less than the second threshold, the vehicle A is traveling at low speed with a small turning amount.

In a case where the turning amount of the vehicle A is small and the speed is low, the motion of the vehicle A is approximately linear. In this case, when the vehicle A is not substantially turning, the detection accuracy of the second yaw angle information using the wheel speed detected by the wheel speed sensor 3E is maintained, and thus, the reliability of the second yaw angle information is high.

Therefore, the weight determination unit 21 increases the weight of the second yaw angle information using the difference in movement distance between the left and right wheels of the vehicle A detected by the wheel speed sensor 3E. Thus, the position estimation device 2 can stably calculate the combined yaw information used for estimating the position of the vehicle A.

In a case where the vehicle speed of the vehicle A is less than the first threshold, and the angular velocity of the vehicle A is equal to or greater than the second threshold, the weight determination unit 21 increases the weight of the third yaw angle information, decreases the weight of the first yaw angle information, and decreases the weight of the second yaw angle information.

When the turning amount of the vehicle A is large and the speed is low, the motion of the vehicle A is approximately a turning motion, and the vehicle A travels at low speed. In this case, a lateral force of the vehicle A is not generated and the sideslip angle of the vehicle A is not generated, and thus, the accuracy of the position estimation using the third yaw angle information obtained by the third positioning method is improved as described in the usage mode (2). Therefore, the weight determination unit 21 increases the weight of the third yaw angle information using the steering angle detected by the steering angle sensor 3F. Thus, the position estimation device 2 can stably calculate the combined yaw information used for estimating the position of the vehicle A.

In addition, in a case where the vehicle speed of the vehicle A is equal to or greater than the first threshold, and the angular velocity of the vehicle A is equal to or greater than the second threshold, the weight determination unit 21 increases the weight of the first yaw angle information, decreases the weight of the second yaw angle information, and decreases the weight of the third yaw angle information.

When the turning amount of the vehicle A is large and the speed is high, the motion of the vehicle A is approximately a turning motion, and the vehicle A travels at high speed. In this case, a lateral force is applied to the vehicle A, so that the sideslip angle of the vehicle A is generated, and thus, the accuracy of the position estimation using the first yaw information obtained by the first positioning method is improved as described in the usage mode (3).

Therefore, the weight determination unit 21 increases the weight of the first yaw angle information using the angular velocity detected by the gyro sensor 3D, decreases the weight of the second yaw angle information using the difference in movement distance between the left and right wheels of the vehicle A detected by the wheel speed sensor 3E, and decreases the weight of the third yaw angle information using the steering angle detected by the steering angle sensor 3F. Thus, the position estimation device 2 can stably calculate the combined yaw information used for estimating the position of the vehicle A.

Note that the first threshold related to the vehicle speed and the second threshold related to the angular velocity may be fixed values determined empirically, or may be dynamically changed depending on the magnitude of the vehicle speed or the angular velocity of the vehicle A.

In a case where the undulation of the road surface on which the vehicle A is traveling is equal to or greater than a third threshold, the weight determination unit 21 may increase the weight of the first yaw angle information, decrease the weight of the second yaw angle information, and decrease the weight of the third yaw angle information.

The third threshold is a value related to undulations of the road surface, and is, for example, a change amount of the pitch rate and a change amount of the roll rate for determining whether or not the vehicle A is vibrating.

In a case where the undulation of the road surface is equal to or greater than the third threshold, the vehicle A on the road surface vibrates, and thus, the detection accuracy of the difference in movement distance between the left and right wheels of the vehicle A by the wheel speed sensor 3E decreases, and the detection accuracy of the steering angle by the steering angle sensor 3F decreases.

Therefore, the weight determination unit 21 increases the weight of the first yaw angle information that is less susceptible to the vibration of the vehicle A, and decreases the weights of the second yaw angle information and the third yaw angle information having an increased error due to the vibration of the vehicle A. Thus, the position estimation device 2 can stably calculate the combined yaw information used for estimating the position of the vehicle A.

In a case where a degree of slippage of the road surface on which the vehicle A is traveling is equal to or greater than a fourth threshold, the weight determination unit 21 may increase the weight of the first yaw angle information, decrease the weight of the second yaw angle information, and decrease the weight of the third yaw angle information. The fourth threshold is a value related to the degree of slippage of the road surface, and is, for example, a value related to a feature amount indicating the degree of wetness or the degree of snow cover on the road surface in an image obtained by imaging the road surface.

In a case where the degree of slippage of the road surface is equal to or greater than the fourth threshold, the vehicle A on the road surface is in a state where the detection accuracy of the difference in movement distance between the left and right wheels of the vehicle A by the wheel speed sensor 3E decreases, and the detection accuracy of the steering angle by the steering angle sensor 3F also decreases.

Therefore, the weight determination unit 21 increases the weight of the first yaw angle information that is less susceptible to the vibration of the vehicle A, and decreases the weights of the second yaw angle information and the third yaw angle information having an increased error due to the vibration of the vehicle A. Thus, the position estimation device 2 can stably calculate the combined yaw information used for estimating the position of the vehicle A.

Note that the third threshold related to the undulations of the road surface and the fourth threshold related to the degree of slippage of the road surface may be fixed values determined empirically, or may be dynamically changed depending on the magnitude of the vehicle speed or the angular velocity of the vehicle A.

(Yaw Information Acquiring Unit)

The yaw information acquiring unit 22 acquires the first yaw angle information, the second yaw angle information, and the third yaw angle information. For example, the yaw information acquiring unit 22 calculates the first yaw angle information, the second yaw angle information, and the third yaw angle information by using the attitude angles (roll angle and pitch angle) of the vehicle A detected by the attitude detecting unit 3C, the angular velocity of the vehicle A detected by the gyro sensor 3D, the wheel speeds of the left and right wheels of the vehicle A detected by the wheel speed sensor 3E, the steering angle of the vehicle A detected by the steering angle sensor 3F, and the vehicle speed of the vehicle A detected by the vehicle speed sensor 3G. Furthermore, the yaw information acquiring unit 22 may acquire yaw angle information of the vehicle A calculated by an arithmetic device (not illustrated) provided independently of the position estimation device 2.

That is, the acquisition of yaw information by the yaw information acquiring unit 22 includes calculation of yaw information in addition to input of yaw information from an external device.

The yaw information acquiring unit 22 that calculates yaw angle information includes a first yaw angle calculating unit 221, a second yaw angle calculating unit 222, and a third yaw angle calculating unit 223 as illustrated in FIG. 2.

First Yaw Angle Calculating Unit

The first yaw angle calculating unit 221 calculates the first yaw angle information of the vehicle A on the basis of the angular velocity of the vehicle A. For example, the first yaw angle calculating unit 221 calculates the first yaw angle information by integrating the angular velocity (yaw rate) of the vehicle A detected by the gyro sensor 3D per sampling time.

Second Yaw Angle Calculating Unit

The second yaw angle calculating unit 222 calculates the second yaw angle information of the vehicle A on the basis of the difference in movement distance between the left and right wheels of the vehicle A. For example, the second yaw angle calculating unit 222 geometrically calculates the yaw rate of the vehicle A using the difference in movement distance between the left and right wheels of the vehicle A detected by the wheel speed sensor 3E and the tread length, and calculates the second yaw angle information by integrating the calculated yaw rate per sampling time.

Third Yaw Angle Calculating Unit

The third yaw angle calculating unit 223 calculates the third yaw angle information of the vehicle A on the basis of the steering angle and the vehicle speed of the vehicle A. For example, the third yaw angle calculating unit 223 calculates the yaw rate of the vehicle A in accordance with the equation of motion using the steering angle of the steering wheel of the vehicle A detected by the steering angle sensor 3F and the vehicle speed of the vehicle A detected by the vehicle speed sensor 3G, and calculates the third yaw angle information by integrating the calculated yaw rate per sampling time.

(Combining Unit)

The combining unit 23 generates combined yaw angle information obtained by combining the first yaw angle information, the second yaw angle information, and the third yaw angle information to which the weights determined by the weight determination unit 21 have been set.

For example, the combining unit 23 adjusts the combining ratio of the first yaw angle information, the second yaw angle information, and the third yaw angle information on the basis of the determined weights, and calculates the combined yaw angle information.

When the combining ratio of the first yaw angle information $\gamma 1$ is K1, the combining ratio of the second yaw angle information $\gamma 2$ is K2, and the combining ratio of the third yaw angle information $\gamma 3$ is K3, the combined yaw angle information $\gamma$sum is obtained by following Expression (1).

$$\gamma\text{sum} = K1\gamma 1 + K2\gamma 2 + K3\gamma 3 \qquad (1)$$

$$K1 + K2 + K3 = 1$$

Note that the combining unit 23 matches the coordinate systems of the first yaw angle information, the second yaw angle information, and the third yaw angle information before combining the first yaw angle information, the second yaw angle information, and the third yaw angle information.

For example, in a case where the attitude of the vehicle A is rolled with respect to the world coordinate system, the combining unit 23 converts the second yaw angle information based on the difference in movement distance between the left and right wheels of the vehicle A from the vehicle coordinate system to the world coordinate system. With this conversion, the value thereof is reduced. As a result, the combined yaw angle information $\gamma$sum in which the influence of the roll of the vehicle A is reduced can be calculated.

When the weight determination unit 21 dynamically changes the weights on the basis of a change in the travel state of the vehicle A or the peripheral state of the vehicle A, the combining unit 23 sequentially sets the changed weights to the first yaw angle information, the second yaw angle information, and the third yaw angle information to generate combined yaw angle information.

Note that the weight determination unit 21 and the combining unit 23 may be artificial intelligence (AI) using a trained model that outputs combined yaw rate information of the first yaw angle information, the second yaw angle information, and the third yaw angle information when receiving the information indicating the travel state of the vehicle A or the peripheral state of the vehicle A, the first yaw angle information, the second yaw angle information, and the third yaw angle information. As a result, it is possible to generate combined yaw angle information depending on a change in the travel state of the vehicle A or the peripheral state of the vehicle A.

(Position Estimation Unit)

The position estimation unit 24 estimates the position of the vehicle A using the positioning information of the vehicle A, the vehicle speed of the vehicle A, and the combined yaw angle information. For example, in a case where the traveling direction of the vehicle A is defined as an x axis and the lateral direction of the vehicle A is defined as a y axis, the position estimation unit 24 calculates the position (x, y) of the vehicle A from a reference position for the position estimation on the basis of following Expression (2). In following Expression (2), L is a movement distance of the vehicle A, and γsum is a combined yaw angle.

$$x = L \cdot \sin(\gamma\text{sum}), \qquad (2)$$
$$y = L \cdot \cos(\gamma\text{sum})$$

Note that the first yaw angle information, the second yaw angle information, and the third yaw angle information may be filtered to remove variations in values and abnormal values.

For example, after calculating the yaw angle information, the first yaw angle calculating unit 221, the second yaw angle calculating unit 222, and the third yaw angle calculating unit 223 perform a filtering process on the calculated yaw angle information. This can suppress a decrease in the accuracy in estimating the position of the vehicle A due to variations in the yaw angle information and abnormal values.

Figure 3:
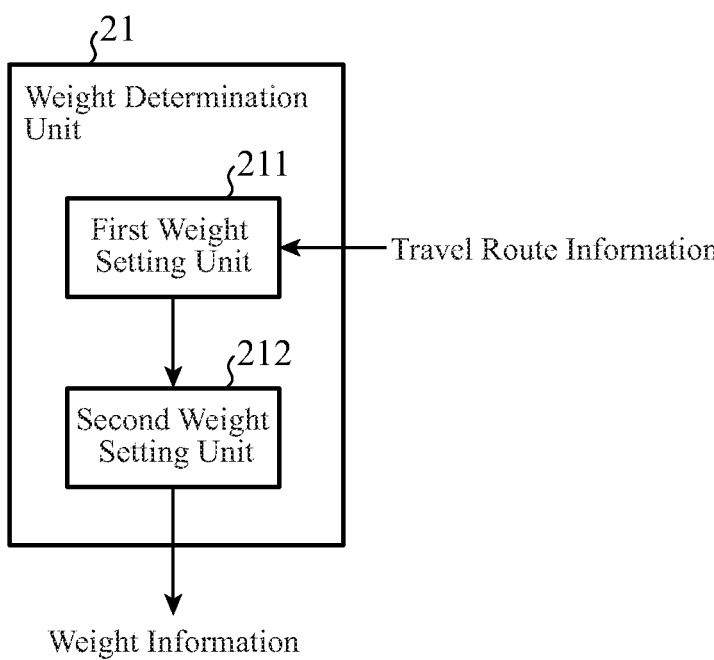
FIG. 3 is a block diagram illustrating the configuration of a weight determination unit according to the first embodiment.

FIG. 3 is a block diagram illustrating the configuration of the weight determination unit 21. As illustrated in FIG. 3, the weight determination unit 21 includes a first weight setting unit 211 and a second weight setting unit 212.

The weight determination unit 21 dynamically changes the weight to be set to each of the first yaw angle information, the second yaw angle information, and the third yaw angle information on the basis of a change in the peripheral state of the vehicle A.

First Weight Setting Unit

The first weight setting unit 211 determines the weights to be set to the first yaw angle information, the second yaw angle information, and the third yaw angle information for each section in the travel route along which the vehicle A travels. For example, the first weight setting unit 211 acquires travel route information from the route calculation unit 7, and divides the route indicated by the acquired travel route information into a plurality of sections based on the road shape or the like.

The first weight setting unit 211 decreases the weight of the first yaw angle information and increases the weight of the second yaw angle information in a section which includes a tunnel and in which the time during which learning of the error of the gyro sensor 3D is impossible is expected to be equal to or longer than the given time.

In addition, the first weight setting unit 211 increases the weight of the second yaw angle information based on the difference in movement distance between the left and right wheels of the vehicle A detected by the wheel speed sensor 3E, and decreases the weight of the first yaw angle information based on the angular velocity of the vehicle A detected by the gyro sensor 3D, within a section where the motion of the vehicle A is approximately linear at low speed at the beginning of traveling.

Furthermore, in a section in which the motion of the vehicle A is approximately linear at high speed, the first weight setting unit 211 increases the weight of the first yaw angle information based on the angular velocity detected by the gyro sensor 3D, decreases the weight of the second yaw angle information, and decreases the weight of the third yaw angle information.

In addition, in a section including a curve of a road where the vehicle A is expected to turn and travel at low speed, the weight determination unit 21 increases the weight of the third yaw angle information based on the steering angle detected by the steering angle sensor 3F and decreases the weight of the second yaw angle information based on the difference in movement distance between the left and right wheels of the vehicle A detected by the wheel speed sensor 3E.

In addition, the weight determination unit 21 increases the weight of the first yaw angle information, decreases the weight of the second yaw angle information, and decreases the weight of the third yaw angle information in, for example, a section including a curve on an expressway where the vehicle A is expected to turn at high speed.

Thus, the position estimation device 2 can stably calculate the combined yaw information used for estimating the position of the vehicle A.

Second Weight Setting Unit

The second weight setting unit 212 changes the weights to be set to the first yaw angle information, the second yaw angle information, and the third yaw angle information depending on a change in the state of the travel route along which the vehicle A is traveling. For example, when the undulations of the road surface on which the vehicle A is traveling are large, the second weight setting unit 212 increases the weight of the first yaw angle information and decreases the weights of the second yaw angle information and the third yaw angle information, the weights having been set by the first weight setting unit 211 in the section in which the vehicle A is traveling. In addition, in a case where the road surface on which the vehicle A is traveling is slippery, the second weight setting unit 212 increases the weight of the first yaw angle information, and decreases the weights of the second yaw angle information and the third yaw angle information that have an increased error due to the influence of the vibration of the vehicle A.

Thus, the position estimation device 2 can stably calculate the combined yaw information used for estimating the position of the vehicle A.

15

(Position Estimation Method)

Figure 4:
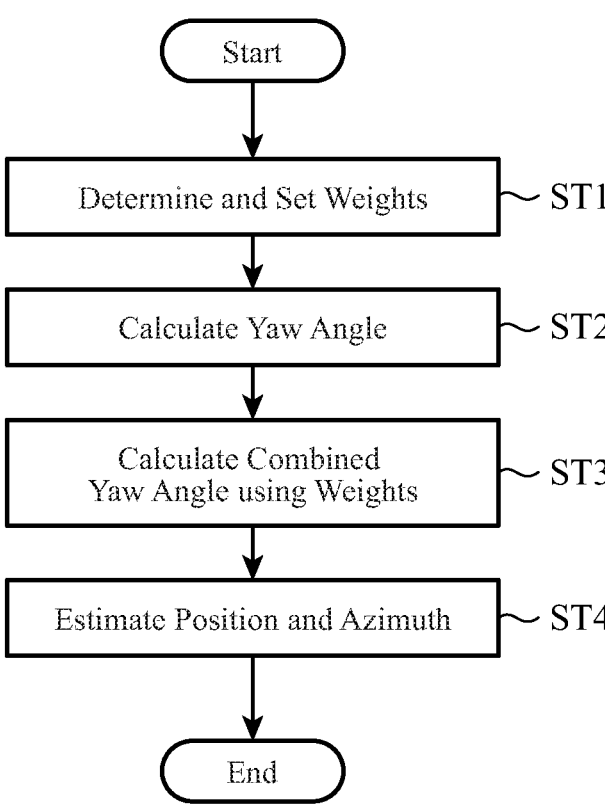
FIG. 4 is a flowchart illustrating a position estimation method according to the first embodiment.

FIG. 4 is a flowchart illustrating the position estimation method according to the first embodiment, and illustrates a series of processes of the position estimation method executed by the position estimation device 2. A series of processes illustrated in FIG. 4 is repeatedly executed while the vehicle A is traveling.

The weight determination unit 21 determines weights to be set to the first yaw angle information, the second yaw angle information, and the third yaw angle information on the basis of the travel state of the vehicle A or the peripheral state of the vehicle A (step ST1).

The yaw information acquiring unit 22 acquires the first yaw angle information, the second yaw angle information, and the third yaw angle information (step ST2).

The combining unit 23 generates combined yaw angle information obtained by combining the first yaw angle information, the second yaw angle information, and the third yaw angle information to which the weights determined by the weight determination unit 21 have been set (step ST3).

The position estimation unit 24 estimates the position and azimuth of the vehicle A using the positioning information of the vehicle A, the vehicle speed of the vehicle A, and the combined yaw angle information (step ST4).

Note that, although FIG. 4 illustrates the case of estimating the position and azimuth of the vehicle A, it is only sufficient that the position estimation device 2 estimates at least the position of the vehicle A. That is, the vehicle automatic control device 4 can control the movement of the vehicle A on the basis of the position of the vehicle A estimated by the position estimation device 2.

By executing the position estimation method illustrated in FIG. 4 by the position estimation device 2, it is possible to suppress an error depending on the characteristics of the positioning method.

Note

Note that the first embodiment is based on the premise that the sensors used in the first positioning method, the second positioning method, and the third positioning method are trained for error factors as much as possible.

For example, when the learning condition of the gyro sensor 3D is bad, the sensor value detected by the gyro sensor 3D may not be used for estimation of the position of the vehicle A from the initial stage of traveling of the vehicle A.

The same applies to the wheel speed sensor 3E and the steering angle sensor 3F. That is, if the detection accuracy of the wheel speed sensor 3E or the detection accuracy of the steering angle sensor 3F is poor, these sensor values may not be used for the estimation of the position of the vehicle A from the initial stage of traveling of the vehicle A.

Next, a hardware configuration for implementing the function of the position estimation device 2 will be described.

The functions of the weight determination unit 21, the yaw information acquiring unit 22, the combining unit 23, and the position estimation unit 24 included in the position estimation device 2 are implemented by a processing circuit. That is, the position estimation device 2 includes a processing circuit for executing the processes from step ST1 to step ST4 illustrated in FIG. 4. The processing circuit may be dedicated hardware, or may be a central processing unit (CPU) that executes a program stored in a memory.

Figure 5A:
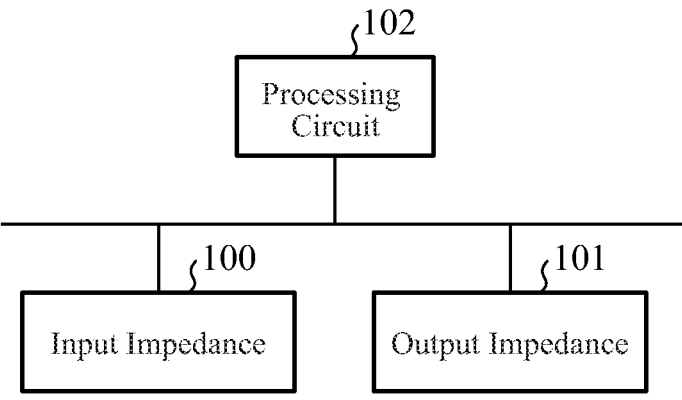
FIGS. 5A and 5B are block diagrams illustrating a hardware configuration that implements functions of the position estimation device according to the first embodiment.

FIG. 5A is a block diagram illustrating a hardware configuration for implementing the function of the position

Figure 5B:
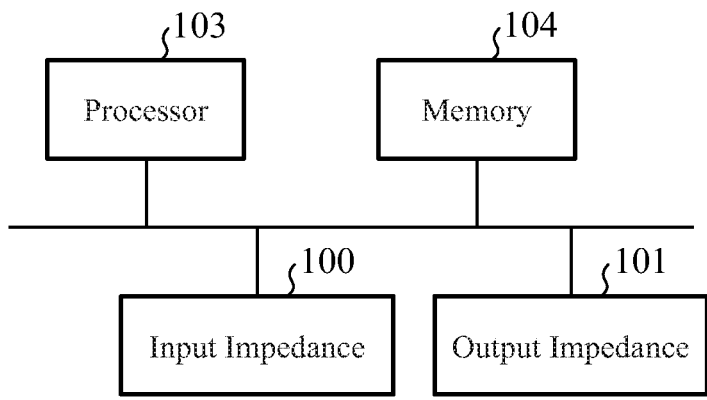

16 estimation device 2. FIG. 5B is a block diagram illustrating a hardware configuration for executing software that implements the function of the position estimation device 2. In FIGS. 5A and 5B, an input interface 100 is an interface that relays detection data acquired by the position estimation device 2 from the sensors 3A to 3G, absolute position information of the vehicle A acquired from the absolute position storage unit 5, and travel route information of the vehicle A acquired from the route calculation unit 7. An output interface 101 is an interface that relays the position estimation result of the vehicle A output from the position estimation device 2 to the vehicle automatic control device 4.

When the processing circuit is a processing circuit 102 that is dedicated hardware illustrated in FIG. 5A, the processing circuit 102 is, for example, a single circuit, a composite circuit, a programmed processor, a parallel programmed processor, an application specific integrated circuit (ASIC), a field-programmable gate array (FPGA), or a combination of some of these circuits. The functions of the weight determination unit 21, the yaw information acquiring unit 22, the combining unit 23, and the position estimation unit 24 included in the position estimation device 2 may be implemented by different processing circuits, or may be collectively implemented by a single processing circuit.

In a case where the processing circuit is a processor 103 illustrated in FIG. 5B, the functions of the weight determination unit 21, the yaw information acquiring unit 22, the combining unit 23, and the position estimation unit 24 in the position estimation device 2 is implemented by software, firmware, or a combination of software and firmware. Note that software or firmware is described as a program and stored in a memory 104.

Program

The processor 103 reads and executes the program stored in the memory 104, thereby implementing the functions of the weight determination unit 21, the yaw information acquiring unit 22, the combining unit 23, and the position estimation unit 24 in the position estimation device 2.

For example, the position estimation device 2 includes the memory 104 for storing programs to eventually execute the processes from step ST1 to step ST4 in the flowchart illustrated in FIG. 4 when the processing in the flowchart is executed by the processor 103.

These programs cause the computer to execute the procedures and methods performed by the weight determination unit 21, the yaw information acquiring unit 22, the combining unit 23, and the position estimation unit 24.

The memory 104 may be a computer-readable storage medium storing a program for causing a computer to function as the weight determination unit 21, the yaw information acquiring unit 22, the combining unit 23, and the position estimation unit 24.

The memory 104 is, for example, a nonvolatile or volatile semiconductor memory such as random access memory (RAM), read only memory (ROM), flash memory, erasable programmable read only memory (EPROM), or electrically-EPROM (EEPROM) (registered trademark), a magnetic disk, a flexible disk, an optical disk, a compact disk, a mini disk, or a digital versatile disk (DVD).

A portion of the functions of the weight determination unit 21, the yaw information acquiring unit 22, the combining unit 23, and the position estimation unit 24 in the position estimation device 2 may be implemented by dedicated hardware, and another portion may be implemented by software or firmware. For example, the function of the yaw information acquiring unit 22 may be implemented by the processing circuit 102 that is dedicated hardware, and the function of each of the weight determination unit 21, the combining unit 23, and the position estimation unit 24 may be implemented by the processor 103 reading and executing a program stored in the memory 104. As described above, the processing circuit can implement the above-mentioned functions by hardware, software, firmware, or a combination thereof.

Note that the position estimation device 2 may estimate the position of the vehicle A using combined yaw rate information obtained by combining yaw rates obtained by the first positioning method, the second positioning method, and the third positioning method. In this case, the first yaw information is first yaw rate information based on the angular velocity of the vehicle A, the second yaw information is second yaw rate information based on the movement distances of the left and right wheels of the vehicle A, and the third yaw information is third yaw rate information based on the steering angle and the vehicle speed of the vehicle A.

For example, the yaw information acquiring unit 22 acquires the first yaw rate information, the second yaw rate information, and the third yaw rate information. The weight determination unit 21 determines weights for combining the first yaw rate information, the second yaw rate information, and the third yaw rate information on the basis of the travel state of the vehicle A or the peripheral state of the vehicle A. The combining unit 23 generates combined yaw rate information obtained by combining the first yaw rate information, the second yaw rate information, and the third yaw rate information to which the determined weights have been set. The position estimation unit 24 estimates the position of the vehicle A using the positioning information of the vehicle A, the vehicle speed of the vehicle A, and the combined yaw rate information.

The position estimation device 2 configured as described above can also suppress an error depending on the characteristics of the positioning method.

As described above, the position estimation device 2 according to the first embodiment includes: the weight determination unit 21 to determine, on the basis of the travel state of the vehicle A or the peripheral state of the vehicle A, weights to be set to first yaw information of the vehicle A based on the angular velocity of the vehicle A, second yaw information of the vehicle A based on the difference in movement distance between left and right wheels of the vehicle A, and third yaw information of the vehicle A based on the steering angle and the vehicle speed of the vehicle A; the yaw information acquiring unit 22 to acquire the first yaw information, the second yaw information, and the third yaw information; the combining unit 23 to generate combined yaw information obtained by combining the first yaw information, the second yaw information, and the third yaw information to which the determined weights have been set; and the position estimation unit 24 to estimate the position of the vehicle A using positioning information of the vehicle A, the vehicle speed of the vehicle A, and the combined yaw information.

By combining the three types of yaw information calculated with the first positioning method, the second positioning method, and the third positioning method with the weights determined based on the travel state of the vehicle A or the peripheral state of the vehicle A, the yaw information of the vehicle A can be stably calculated, and thus, the accuracy of estimating the position and the azimuth (attitude angle) of the vehicle A is improved. As a result, the position estimation device 2 can suppress an error depending on the characteristics of the positioning method.

In the position estimation device 2 according to the first embodiment, the yaw information acquiring unit 22 includes the first yaw angle calculating unit 221 to calculate the first yaw angle information of the vehicle A based on the angular velocity of the vehicle A, the second yaw angle calculating unit 222 that calculates the second yaw angle information of the vehicle A based on the difference in movement distance between the left and right wheels of the vehicle A, and a third yaw angle calculating unit 223 that calculates the third yaw angle information of the vehicle A based on the steering angle and the vehicle speed of the vehicle A.

The three types of yaw angle information calculated with the first positioning method, the second positioning method, and the third positioning method can be combined with the weights determined based on the travel state of the vehicle A or the peripheral state of the vehicle A, whereby the accuracy of estimating the position and the azimuth (attitude angle) of the vehicle A is improved. As a result, the position estimation device 2 can suppress an error depending on the characteristics of the positioning method.

In the position estimation device 2 according to the first embodiment, in a case where the vehicle speed of the vehicle A is equal to or greater than the first threshold, the angular velocity of the vehicle A is less than the second threshold, and the time during which an error in the angular velocity of the vehicle A is not removed is less than a given time, the weight determination unit 21 increases the weight of the first yaw angle information, decreases the weight of the second yaw angle information, and decreases the weight of the third yaw angle information, and in a case where the time during which the error in the angular velocity of the vehicle A is not removed is equal to or longer than the given time, the weight determination unit 21 decreases the weight of the first yaw angle information and increases the weight of the second yaw angle information. Thus, the position estimation device 2 can stably calculate the yaw information of the vehicle A.

In the position estimation device 2 according to the first embodiment, the weight determination unit 21 increases the weight of the second yaw angle information, decreases the weight of the first yaw angle information, and decreases the weight of the third yaw angle information, in a case where the vehicle speed of the vehicle A is less than the first threshold, and the angular velocity of the vehicle A is less than the second threshold. Thus, the position estimation device 2 can stably calculate the yaw information of the vehicle A.

In the position estimation device 2 according to the first embodiment, the weight determination unit 21 increases the weight of the third yaw angle information, decreases the weight of the first yaw angle information, and decreases the weight of the second yaw angle information in a case where the vehicle speed of the vehicle A is less than the first threshold, and the angular velocity of the vehicle A is equal to or greater than the second threshold, and increases the weight of the first yaw angle information, decreases the weight of the second yaw angle information, and decreases the weight of the third yaw angle information in a case where the vehicle speed of the vehicle A is greater than or equal to the first threshold, and the angular velocity of the vehicle A is greater than or equal to the second threshold. Thus, the position estimation device 2 can stably calculate the yaw information of the vehicle A.

In the position estimation device 2 according to the first embodiment, the weight determination unit 21 increases the weight of the first yaw angle information, decreases the weight of the second yaw angle information, and decreases the weight of the third yaw angle information in a case where the undulation of the road surface on which the vehicle A is traveling is equal to or greater than the third threshold.

Thus, the position estimation device 2 can stably calculate the yaw information of the vehicle A.

In the position estimation device 2 according to the first embodiment, the weight determination unit 21 increases the weight of the first yaw angle information, decreases the weight of the second yaw angle information, and decreases the weight of the third yaw angle information in a case where the degree of slippage of the road surface on which the vehicle A is traveling is equal to or greater than the fourth threshold. Thus, the position estimation device 2 can stably calculate the yaw information of the vehicle A.

In the position estimation device 2 according to the first embodiment, the weight determination unit 21 includes a first weight setting unit 211 to determine weights to be set to the first yaw angle information, the second yaw angle information, and the third yaw angle information for each section in the travel route along which the vehicle A travels, and a second weight setting unit 212 to change the weights to be set to the first yaw angle information, the second yaw angle information, and the third yaw angle information depending on a change in the state of the travel route during traveling of the vehicle A.

Thus, the position estimation device 2 can stably calculate the yaw information of the vehicle A.

In the position estimation device 2 according to the first embodiment, the first yaw information is first yaw rate information based on the angular velocity of the vehicle A, the second yaw information is second yaw rate information based on the movement distances of the left and right wheels of the vehicle A, and the third yaw information is third yaw rate information based on the steering angle and the vehicle speed of the vehicle A.

By combining the three types of yaw rate information calculated with the first positioning method, the second positioning method, and the third positioning method with the weights determined based on the travel state of the vehicle A or the peripheral state of the vehicle A, the yaw rate information of the vehicle A can be stably calculated, and thus, the accuracy of estimating the position and the azimuth of the vehicle A is improved. As a result, the position estimation device 2 can suppress an error depending on the characteristics of the positioning method.

The automated driving system 1 according to the first embodiment includes the position estimation device 2 and the vehicle automatic control device 4 that controls the movement of the vehicle A on the basis of the position of the vehicle A estimated by the position estimation device 2. The automated driving system 1 can accurately control the movement of the vehicle A using the estimation result of the position of the vehicle A in which the error depending on the characteristics of the positioning method is suppressed, the estimation result having been acquired from the position estimation device 2.

The position estimation method according to the first embodiment includes: determining, by the weight determination unit 21, weights to be set to first yaw information of the vehicle A based on the angular velocity of the vehicle A, second yaw information of the vehicle A based on the difference in movement distance between left and right wheels of the vehicle A, and third yaw information of the vehicle A based on the steering angle and the vehicle speed of the vehicle A, on the basis of the travel state of the vehicle A or the peripheral state of the vehicle A; acquiring the first yaw information, the second yaw information, and the third yaw information by the yaw information acquiring unit 22; generating, by the combining unit 23, combined yaw information obtained by combining the first yaw information, the second yaw information, and the third yaw information to which the determined weights have been set; and estimating, by the position estimation unit 24, the position of the vehicle A using positioning information of the vehicle A, the vehicle speed of the vehicle A, and the combined yaw information. As a result, the position estimation method according to the first embodiment enables suppression of an error depending on the characteristics of the positioning method.

The program according to the first embodiment can cause one or more computers to function as the position estimation device 2 capable of suppressing an error depending on the characteristics of the positioning method by being executed by one or more computers.

Various aspects of the present disclosure will be collectively described below as supplementary matters.

Supplementary Matter 1

A position estimation device including:

a weight determination unit to determine, on the basis of a travel state of a vehicle or a peripheral state of the vehicle, weights to be set to first yaw information of the vehicle based on an angular velocity of the vehicle, second yaw information of the vehicle based on a difference in movement distance between left and right wheels of the vehicle, and third yaw information of the vehicle based on a steering angle and a vehicle speed of the vehicle;

a yaw information acquiring unit to acquire the first yaw information, the second yaw information, and the third yaw information;

a combining unit to generate combined yaw information obtained by combining the first yaw information, the second yaw information, and the third yaw information to which the determined weights have been set; and a position estimation unit to estimate a position of the vehicle using positioning information of the vehicle, the vehicle speed of the vehicle, and the combined yaw information.

Supplementary Matter 2

The position estimation device according to Supplementary Matter 1, wherein the yaw information acquiring unit includes:

a first yaw angle calculating unit to calculate first yaw angle information of the vehicle on the basis of the angular velocity of the vehicle;

a second yaw angle calculating unit to calculate second yaw angle information of the vehicle on the basis of the difference in movement distance between the left and right wheels of the vehicle; and a third yaw angle calculating unit to calculate third yaw angle information of the vehicle on the basis of the steering angle and the vehicle speed of the vehicle.

Supplementary Matter 3

The position estimation device according to Supplementary Matter 2, wherein

21 the weight determination unit increases a weight of the first yaw angle information, decreases a weight of the second yaw angle information, and decreases a weight of the third yaw angle information in a case where the vehicle speed of the vehicle is equal to or greater than a first threshold, the angular velocity of the vehicle is less than a second threshold, and a time during which an error in the angular velocity of the vehicle is not removed is less than a given time, and decreases the weight of the first yaw angle information and increases the weight of the second yaw angle information in a case where the time during which the error in the angular velocity of the vehicle is not removed is equal to or longer than the given time.

Supplementary Matter 4

The position estimation device according to Supplementary Matter 3, wherein the weight determination unit increases the weight of the second yaw angle information, decreases the weight of the first yaw angle information, and decreases the weight of the third yaw angle information, in a case where the vehicle speed of the vehicle is less than the first threshold, and the angular velocity of the vehicle is less than the second threshold.

Supplementary Matter 5

The position estimation device according to Supplementary Matter 3 or 4, wherein the weight determination unit increases the weight of the third yaw angle information, decreases the weight of the first yaw angle information, and decreases the weight of the second yaw angle information in a case where the vehicle speed of the vehicle is less than the first threshold, and the angular velocity of the vehicle is equal to or greater than the second threshold, and increases the weight of the first yaw angle information, decreases the weight of the second yaw angle information, and decreases the weight of the third yaw angle information in a case where the vehicle speed of the vehicle is equal to or greater than the first threshold, and the angular velocity of the vehicle is equal to or greater than the second threshold.

Supplementary Matter 6

The position estimation device according to any one of Supplementary Matters 3 to 5, wherein the weight determination unit increases the weight of the first yaw angle information, decreases the weight of the second yaw angle information, and decreases the weight of the third yaw angle information in a case where an undulation of a road surface on which the vehicle is traveling is equal to or greater than a third threshold.

Supplementary Matter 7

The position estimation device according to any one of Supplementary Matters 3 to 6, wherein the weight determination unit increases the weight of the first yaw angle information, decreases the weight of the second yaw angle information, and decreases the weight of the third yaw angle information in a case where a degree of slippage of a road surface on which the vehicle is traveling is equal to or greater than a fourth threshold.

Supplementary Matter 8

The position estimation device according to any one of Supplementary Matters 3 to 7, wherein the weight determination unit includes:

a first weight setting unit to determine weights to be set to the first yaw angle information, the second yaw angle information, and the third yaw angle information for each section in a travel route along which the vehicle travels; and a second weight setting unit to change the weights to be set to the first yaw angle information, the second yaw angle information, and the third yaw angle information depending on a change in a state of the travel route during traveling of the vehicle.

Supplementary Matter 9

The position estimation device according to Supplementary Matter 1, wherein the first yaw information is first yaw rate information based on the angular velocity of the vehicle, the second yaw information is second yaw rate information based on movement distances of the left and right wheels of the vehicle, and the third yaw information is third yaw rate information based on the steering angle and the vehicle speed of the vehicle.

Supplementary Matter 10

An automated driving system including:

the position estimation device according to any one of Supplementary Matters 1 to 9; and a vehicle automatic control device to control movement of the vehicle on the basis of a position of the vehicle estimated by the position estimation device.

Supplementary Matter 11

A position estimation method performed by a position estimation device, the method comprising:

determining, by a weight determination unit, weights to be set to first yaw information of a vehicle based on an angular velocity of the vehicle, second yaw information of the vehicle based on a difference in movement distance between left and right wheels of the vehicle, and third yaw information of the vehicle based on a steering angle and a vehicle speed of the vehicle, on the basis of a travel state of the vehicle or a peripheral state of the vehicle;

acquiring the first yaw information, the second yaw information, and the third yaw information by a yaw information acquiring unit;

generating, by a combining unit, combined yaw information obtained by combining the first yaw information, the second yaw information, and the third yaw information to which the determined weights have been set; and estimating a position of the vehicle using positioning information of the vehicle, the vehicle speed of the vehicle, and the combined yaw information by a position estimation unit.

Supplementary Matter 12

A program to cause a computer to function as:
a weight determination unit to determine, on the basis of a travel state of a vehicle or a peripheral state of the vehicle, weights to be set to first yaw information of the vehicle based on an angular velocity of the vehicle, second yaw information of the vehicle based on a difference in movement distance between left and right wheels of the vehicle, and third yaw information of the vehicle based on a steering angle and a vehicle speed of the vehicle;
a yaw information acquiring unit to acquire the first yaw information, the second yaw information, and the third yaw information;
a combining unit to generate combined yaw information obtained by combining the first yaw information, the second yaw information, and the third yaw information to which the determined weights have been set; and
a position estimation unit to estimate a position of the vehicle using positioning information of the vehicle, the vehicle speed of the vehicle, and the combined yaw information.

It is to be noted that any components in the embodiment can be modified or omitted.

REFERENCE SIGNS LIST

1: automated driving system, 2: position estimation device, 3A: absolute position detecting unit, 3B: road surface detecting unit, 3C: attitude detecting unit, 3D: gyro sensor, 3E: wheel speed sensor, 3F: steering angle sensor, 3G: vehicle speed sensor, 4: vehicle automatic control device, 5: absolute position storage unit, 6: map information storage unit, 7: route calculation unit, 100: input impedance, 101: output impedance, 102: processing circuit, 103: processor, 104: memory, 211: first weight setting unit, 212: second weight setting unit, 221: first yaw angle calculating unit, 222: second yaw angle calculating unit, 223: third yaw angle calculating unit

The invention claimed is:
1. An automated driving system comprising:
a position estimation device comprising processing circuitry performing:
  to determine, on a basis of a travel state of a vehicle or a peripheral state of the vehicle, weights to be set to first yaw information of the vehicle based on an angular velocity of the vehicle, second yaw information of the vehicle based on a difference in movement distance between left and right wheels of the vehicle, and third yaw information of the vehicle based on a steering angle and a vehicle speed of the vehicle;
  to acquire the first yaw information, the second yaw information, and the third yaw information;
  to generate combined yaw information obtained by combining the first yaw information, the second yaw information, and the third yaw information to which the determined weights have been set; and
  to estimate an estimated position of the vehicle using positioning information of the vehicle, the vehicle speed of the vehicle, and the combined yaw information; and
a vehicle automatic control device to control movement of the vehicle on a basis of the estimated position.

2. The automated driving system according to claim 1, wherein
the processing circuitry includes performing:
  to calculate first yaw angle information of the vehicle as the first yaw information on a basis of the angular velocity of the vehicle;
  to calculate second yaw angle information of the vehicle as the second yaw information on a basis of the difference in movement distance between the left and right wheels of the vehicle; and
  to calculate third yaw angle information of the vehicle as the third yaw information on a basis of the steering angle and the vehicle speed of the vehicle.

3. The automated driving system according to claim 2, wherein
the processing circuitry increases the weight of the first yaw angle information, decreases the weight of the second yaw angle information, and decreases the weight of the third yaw angle information in a case where an undulation of a road surface on which the vehicle is traveling is equal to or greater than a third threshold.

4. The automated driving system according to claim 2, wherein
the processing circuitry increases the weight of the first yaw angle information, decreases the weight of the second yaw angle information, and decreases the weight of the third yaw angle information in a case where a degree of slippage of a road surface on which the vehicle is traveling is equal to or greater than a fourth threshold.

5. The automated driving system according to claim 2, wherein
the processing circuitry includes performing:
  to determine weights to be set to the first yaw angle information, the second yaw angle information, and the third yaw angle information for each section in a travel route along which the vehicle travels; and
  to change the weights to be set to the first yaw angle information, the second yaw angle information, and the third yaw angle information depending on a change in a state of the travel route during traveling of the vehicle.

6. The automated driving system according to claim 2, wherein
the processing circuitry increases a weight of the first yaw angle information, decreases a weight of the second yaw angle information, and decreases a weight of the third yaw angle information in a case where the vehicle speed of the vehicle is equal to or greater than a first threshold, the angular velocity of the vehicle is less than a second threshold, and a time during which an error in the angular velocity of the vehicle is not removed is less than a given time, and
decreases the weight of the first yaw angle information and increases the weight of the second yaw angle information in a case where the time during which the error in the angular velocity of the vehicle is not removed is equal to or longer than the given time.

7. The automated driving system according to claim 6, wherein
the processing circuitry increases the weight of the second yaw angle information, decreases the weight of the first yaw angle information, and decreases the weight of the third yaw angle information, in a case where the vehicle speed of the vehicle is less than the first threshold, and the angular velocity of the vehicle is less than the second threshold.

8. The automated driving system according to claim 6, wherein the processing circuitry increases the weight of the third yaw angle information, decreases the weight of the first yaw angle information, and decreases the weight of the second yaw angle information in a case where the vehicle speed of the vehicle is less than the first threshold, and the angular velocity of the vehicle is equal to or greater than the second threshold, and increases the weight of the first yaw angle information, decreases the weight of the second yaw angle information, and decreases the weight of the third yaw angle information in a case where the vehicle speed of the vehicle is equal to or greater than the first threshold, and the angular velocity of the vehicle is equal to or greater than the second threshold.

9. The automated driving system according to claim 1, wherein the first yaw information is first yaw rate information based on the angular velocity of the vehicle, the second yaw information is second yaw rate information based on movement distances of the left and right wheels of the vehicle, and the third yaw information is third yaw rate information based on the steering angle and the vehicle speed of the vehicle.

10. An automated driving method comprising a position estimation method, performed by a position estimation device, and a vehicle automatic control method performed by a vehicle automatic control device, the position estimation method comprising:

determining weights to be set to first yaw information of a vehicle based on an angular velocity of the vehicle, second yaw information of the vehicle based on a difference in movement distance between left and right wheels of the vehicle, and third yaw information of the vehicle based on a steering angle and a vehicle speed of the vehicle, on a basis of a travel state of the vehicle or a peripheral state of the vehicle;

acquiring the first yaw information, the second yaw information, and the third yaw information;

generating combined yaw information obtained by combining the first yaw information, the second yaw information, and the third yaw information to which the determined weights have been set; and estimating an estimated position of the vehicle using positioning information of the vehicle, the vehicle speed of the vehicle, and the combined yaw information, and the vehicle automatic control method comprising controlling control movement of the vehicle on a basis of the estimated position.

11. A non-transitory tangible computer readable storage medium storing a program to cause a computer to perform:

to determine, on a basis of a travel state of a vehicle or a peripheral state of the vehicle, weights to be set to first yaw information of the vehicle based on an angular velocity of the vehicle, second yaw information of the vehicle based on a difference in movement distance between left and right wheels of the vehicle, and third yaw information of the vehicle based on a steering angle and a vehicle speed of the vehicle;

to acquire the first yaw information, the second yaw information, and the third yaw information;

to generate combined yaw information obtained by combining the first yaw information, the second yaw information, and the third yaw information to which the determined weights have been set;

to estimate an estimated position of the vehicle using positioning information of the vehicle, the vehicle speed of the vehicle, and the combined yaw information; and to control movement of the vehicle on a basis of the estimated position of the vehicle estimated.

* * * * *